3,784,504
THERMOSET RESINS PREPARED FROM DIHYDRIC PHENOL, DIHALOBENZENOID COMPOUND AND POLYHALOHETEROCYCLIC COMPOUND
Ronald George Feasey, Welwyn Garden City, England, assignor to Imperial Chemical Industries Limited, London, England
No Drawing. Continuation of application Ser. No. 801,837, Feb. 24, 1969. This application July 19, 1971, Ser. No. 164,147
Int. Cl. C08g 33/10
U.S. Cl. 260—37 N
11 Claims

ABSTRACT OF THE DISCLOSURE

Thermoset resins containing units of Formulae I, II and III, in such proportions that I is in molar excess of II and III is present to the extent of about two-thirds of this molar excess, may be made via a new thermosettable propolymer from a double alkali metal salt of a dihydric phenol HO—E—OH, a dihalobenzenoid compound X—E'—X and a polyhaloheterocyclic compound (IV) where Z is :N. or :C(X'). (X' is halogen), such as pentachloropyridine or 2,4,6-trichloro-1,3,5-triazine. Some of the alkali metal phenoxide may be omitted initially and is then added to the incomplete prepolymers for curing. The combination of the dihalobenzenoid compound with an equimolar amount of the alkali metal salt of the dihydric phenol may be replaced by an alkali metal salt of a suitable halophenol.

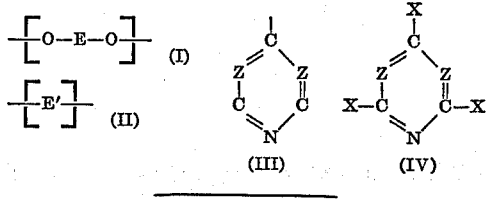

This application is a continuation of Ser. No. 801,837, filed Feb. 24, 1969.

This invention relates to new thermosetting plastic.

According to the invention, a new thermoset resin contains units of Formulae I, II and III in such proportions that I is in molar excess of II and III is present to the extent of about two-thirds of this molar excess.

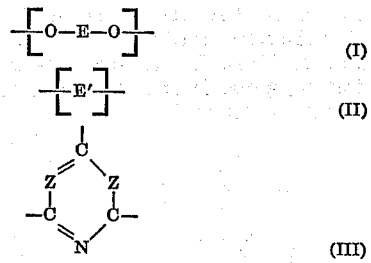

In these Formulae E is the residuum of a dihydric phenol, E' is the residuum of a benzenoid compound having an inert electron-withdrawing group in at least one of the positions ortho or para to the valence bonds, and Z is :N. or :C(X'). where X' is halogen. E and E' are more fully defined and described in British specification 1,078,234, the disclosure of which is herewith incorporated by reference.

Thus, as described in British specification 1,078,234, the residuum E of the dihydric phenol can be, for instance, a mononuclear phenylene group as results from hydroquinone and resorcinol, or it may be a di- or polynuclear residuum. Likewise it is possible that the residuum be substituted with other inert nuclear substantuents, e.g. halogen, alkyl, and alkoxy substituents. It is preferred that the dihydric phenol be a weakly acidic dinuclear phenol, for example, the dihydroxy diphenyl alkanes or the nuclear halogenated derivatives thereof, for example, the 2,2-bis(4-hydroxyphenyl)propane, 1,1 - bis(4 - hydroxyphenyl)2-phenyl ethane, bis(4-hydroxyphenyl)methane, or the chlorinated derivatives containing one or two chlorines on each aromatic ring. While these halogenated bisphenolic alkanes are more acidic than the non-halogenated bisphenols and hence slower in reactivity in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen.

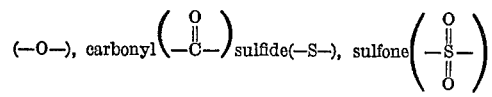

or hydrocarbon residue in which the two phenolic nuclei are joined to the same or different carbon atoms of the residue, for example, the bisphenol of acetophenone, the bisphenol of benzophenone, the bisphenol of vinyl cyclohexene, the bisphenol of α-pinene, and bisphenols where the hydroxyphenyl groups are bound to the same or different carbon atoms of an organic linking group.

Such dinuclear phenols can be characterized as having the structure:

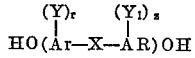

wherein Ar is an aromatic group and preferably is a phenylene group, Y and $Y_1$ can be the same or different inert substituent groups (e.g. alkyl groups having from 1 to 4 carbon atoms, halogen atoms, i.e. fluorine, chlorine, bromine or iodine, or alkoxy radicals having from 1 to 4 carbon atoms), r and z are 0 or integers having a value from 1 to 4, inclusive, and X is representative of a bond between aromatic carbon atoms as in dihydroxydiphenyl, or is a divalent radical, including for example, inorganic radicals (e.g.

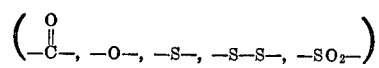

and divalent organic hydrocarbon radicals, e.g. alkylene, alkylidene, cycloaliphatic, or the halogen, alkyl, aryl substituted alkylene. alkylidene and cycloaliphatic radicals as well as alkalicyclic, alkarylene and aromatic radicals and a ring fused to both Ar group.

Examples of specific dihydric polynuclear phenols include among others:

the bis-(hydroxyphenyl)alkanes, e.g.
2,2-bis-(4-hydroxyphenyl)propane,
2,4'-dihydroxy-diphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxy-phenyl)-ethane,
1,2-bis-(4-hydroxyphenyl)ethane,
1,1-bis-(4-hydroxy-2-chlorphenyl)ethane,
1,1-bis-(3-methyl-4-hydroxyphenyl)propane,
1,3-bis(3-methyl-4-hydroxyphenyl)propane,
2,2-bis-(3-phenyl-4-hydroxyphenyl)-propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane, and
2,2-bis-(4-hydroxyphenyl)-1,1,1,3,3,3-hexafluoropropane;

di(hydroxyphenyl)sulfones, e.g.
bis-(4-hydroxyphenyl)sulfone,
2,4'-dihydroxy-diphenyl sulfone,
5'-chloro-2,4'-dihydroxy-diphenyl sulfone, and
5'-chloro-4,4'-dihydroxydiphenyl sulfone;

di(hydroxyphenyl)ethers, e.g.
bis-(4-hydroxyphenyl)ether,
the 4,3'-, 4,2'-, 2,2'-2,3'-, dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)-ether,
bis-(4-hydroxy-3-bromophenyl)ether,
bis-(4-hydroxynaphthyl)ether,
bis-(4-hydroxy-3-chloronaphthyl)ether,
bis-(2-hydroxyphenyl)ether,
4,4'-dihydroxy-3,6-dimethoxydiphenyl ether, and
4,4'-dihydroxy-2,5-diethoxy-diphenyl ether.

It is also contemplated in this invention to use a mixture of two or more different dihydric phenols to accomplish the same ends as above. Thus when referred to above the —E— residuum in the polymer structure can actually be the same or different aromatic residuums.

As herein used the term "residuum of the (or a) dihydric phenol" means the residue of the dihydric phenol after the removal of the two aromatic hydroxyl groups.

As for E', any dihalobenzenoid compound or mixture of dihalobenzenoid compounds can be employed in this invention which compound or compounds has the two halogens bonded to benzene rings having an electron withdrawing group in at least one of the positions ortho or para to the halogen groups. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, as mentioned before, this water content should be maintained below about 1% and preferably below 0.5% for best results.

Any electron withdrawing group can be employed as the activator group in these compounds. It should be, of course, inert to the reaction, but otherwise its structure is not critical. Preferred are the strong activaing groups, e.g. the sulfone group

bonding two halogen substituted benzenoid nuclei, as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing) or other groups having a positive sigma* value, as set forth in J. F. Bunnett in Chem. Rev. 49 273 (1951) and Quart. Rev. 121 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity to promote the reaction is evidenced in those groups having a sigma* value above 0.7, although the reaction rate with such a low powered electron withdrawing group may be somewhat low.

The activating group can be basically either of two types:

(A) Monovalent groups that activate one or more halogens on the same ring, e.g. a nitro group, phenylsulfone, or alkylsulfone, cyano, trifluoromethyl, nitroso, and hetero nitrogen as in pyridine.

(B) Divalent group which can activate displacement of halogens on two different rings, e.g. the sulfone group

the carbonyl group

the vinyl group

the sulfoxide group

the azo group —N=N—; the saturated fluorocarbon grooups —CF₂CF₂—; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

It will be seen that as used herein, the term "residuum of the (or a) benzenoid compound" means the aromatic or benzenoid residue of the dihalobenzenoid compound after the removal of the halogen atoms on the benzenoid nucleus. Thus, the residuum has an inert electron withdrawing group in at least one of the positions ortho or para to the valence bonds.

The thermoset resins may be made via a new thermosettable prepolymer prepared under anhydrous conditions and in the liquid phase of an inert highly polar solvent from a double alkali metal salt of a dihydric phenol of Formula Ia, a dihalobenzenoid compound of Formula IIa and a polyhaloheterocyclic compound of Formula IIIa, the relative proportions of Ia, IIa and IIIa being the same as for I, II and III above.

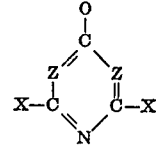

In these formulae, E. E', X and Z are as defined above, and the combination of IIa with an equimolar amount of a di-alkali metal salt of Ia may be replaced wholly or in part by an alkali metal salt of a helophenol of Formula IV

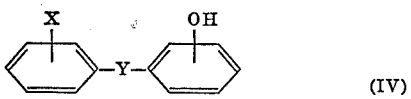
(IV)

where X is as defined above and Y is .SO₂., .SO. or .CO. or a radical of the formula Y'-A-Y" in which Y' and Y" are the same or different and each is .SO₂., .SO. or .CO. and A is a bivalent organic radical which may be aliphatic, aromatic or heterocyclic and has both valencies linked to carbon atoms.

Convenient proportions of Ia:IIa:IIIa are about 6:3:2.

The preparation of the prepolymers of the invention may be carried out in general by the procedure described in British specification 1,078,234 and the modification of this described in British specification 1,133,561; the disclosure of these specifications is herewith incorporated by reference. When all of the monomeric material is present from the beginning of the reaction, a viscous solution of the prepolymer is obtained at 180–250° C., from which a thermosetting resin can be isolated and subsequently cured at 250–350° C. to give the thermoset product. Alternatively, the prepolymer may be prepared from a reactant mixture which is partially or totally deficient in one component. In such cases, the partially or totally omitted component may be added to the prepolymer until the deficiency is eliminated, and the resulting mixture cured to the thermoset product.

The temperatures required depend on the reactivities of the monomeric materials and particularly on the halogen atom X and the extent to which it is activated by electron-withdrawing groups in the molecule. In particular, any compound in which X is fluorine is generally more reactive than where X is chlorine or bromine and so that lower temperatures can be used.

A particularly convenient value for E and E' is

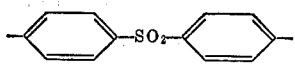

and E may also conveniently be

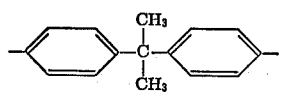

as in Example 1 of British specification 1.078,234. Where both E and E' have the former structure, an equimolar combination of Ia and IIa can be usefully be replaced by an alkali salt of a 4-(4-halophenylsulphonyl) phenol as described in Netherlands application 6613475 (British complete specification 40,734/65). The conditions of polymerization in anhydrous solution described therein are also generally relevant to the present invention, and the disclosure of that specification is therefore also incorporated herewith by reference.

The prepolymers of the invention may be isolated in conventional manner by pouring the reaction mixture with stirring into a liquid in which the prepolymer is not soluble.

When only part of the monomeric material is prepolymerized, and the remaining reactants are added for curing, it is desirable not to omit any of the components entirely from the prepolymerization reaction mixture as this would give a prepolymer of very low molecular weight which might be difficult to isolate. The component withheld from such incomplete prepolymers and subsequently added for curing is preferably of Formula Ia (rather than IIa or IIIa) because it is relatively non-volatile and is unlikely to be lost during the curing step. This, for example the incomplete prepolymer obtained from the di-potassium salt of bis-(4-hydroxyphenyl) sulphone (0.15 mole), bis-(4-chlorophenyl) sulphone (0.11 mole) and pentachloropyridine (0.067 mole) may be cured to a fully cross-linked product after adding further di-potassium salt of bis(4-chlorophenyl) sulphone (0.05 mole). (The slight excess of bis-(4-chlorophenyl) sulphone ensures that Cl rather than KO end-groups are present.)

The prepolymer may be dry-blended with fibrous reinforcing materials, for example glass, asbestos or carbon fibers, and these compositions can be fabricated and cured by heating, preferably at about 300° C. under pressure for at least 10 minutes. Alternatively, fibrous reinforcements may be impregnated and surfaces may be coated in known manner using solutions of the prepolymer in a volatile solvent such as dimethylformamide or dimethyl sulphoxide.

When fibers are dry-blended with the polymer, the adhesion of the resin to the fibre becomes particularly strong on moulding if the fibres are pretreated with a solution of an aromatic polymer containing sulphone groups in the polymer chains, or described for example in British specifications, 1,016,245 and 1.078,234. A similar effect may be achieved by pretreatment with a prepolymer solution according to the present invention.

The following examples illustrate the invention.

EXAMPLE 1

Bis-(4-hydroxyphenyl) sulphone (50.12 g. 0.20 mole), bis-(4-chlorophenyl) sulphone (31.64 g.; 0.11 mole), pentachloropyridine (16.76 g.; 0.067 mole), 40% aqueous potassium hydroxide solution (65.04 g.; 0.40 mole KOH), chlorobenzene (400 cm.³) and 1,1-dioxothiolan (100 cm.³) were introduced into a 2-litre round-bottom flask fitted with a stirrer, thermometer, nitrogen inlet and reverse Dean and Stark assembly. The contents of the flask were heated and water was completely removed by azeotropic distillation. The temperature was increased and chlorobenzene was distilled from the flask until the temperature of the reaction mixture reached 220° C. Heating was continued at this temperature for 4.5 hours, when the reaction mixture was dark and viscous. The mixture was allowed to cool and was then diluted with dimethyl formamide. The resulting solution was filtered then dripped into stirred methanol. The pale brown precipitate was washed thoroughly with hot methanol and then dried for 16 hours at 100° G. in vacuo to give a prepolymer (59 g.) of reduced viscosity 0.23. On heating at 320° C. for 20 minutes, 77% of the prepolymer became completely insoluble in hot dimethyl formamide.

Glass fibres (3.2 mm.; vinyltrichlorosilane-coated) were slurried in a 5% w./v. solution in chloroform of a polymer of the type described in Example 1 of British specification 1,078,234 and then were filtered off and dried in vacuo. The fibres (1 part) were blended in a cutter with the prepolymer (3 parts) prepared as described above. The resulting composition was compression-moulded at 320° C. for 20 minutes to give a very stiff strong plaque with a high surface gloss. The plaque was virtually unaffected by hot dimethylformamide. When the pretreatment of the glass fibres with the polymer of British specification 1,078,234 was omitted, fragile composites were obtained.

EXAMPLE 2

The procedure of Example 1 was followed using bis-(4-hydroxyphenyl) sulphone (52.56 g.; 0.21 mole), bis,4-chlorophenyl) sulphone (28.76 g.; 0.10 mole), pentachloropyridine (16.76 g.; 0.067 mole), 40% aqueous potassium hydroxide solution (58.8 g.; 0.42 mole KOH), chlorobenzene (400 cm.³) and 1,1-dioxothiolan (100 cm.³). After the distillation of water and chlorobenzene, the reaction mixture was stirred at 230° C. until it became viscous. The product was worked up as in Example 1 to give a prepolymer (57.2 g.) of reduced viscosity 0.25. On heating at 320° C. for 20 minutes, 68% of the prepolymer became completely insoluble in hot dimethylformamide.

Asbestos fibre (British Drug Houses "Micro-AR") was thoroughly blended with an equal weight of the prepolymer prepared as described above. The resulting composition was compression-moulded at 320° C. for 1 hour to a plaque which was cured at 280° C. for 16 hours. The cured composite was strong and rigid and was virtually unaffected by hot dimethylformamide. On heating in a Stanton "Massflow" balance at a heating rate of 18 deg. C./min., 10% weight loss occurred at 495° C.

I claim:
1. A thermoset resin consisting essentially of units of Formulae I, II and III in such proportions that I is in molar excess of II and III is present to the extent of about two-thirds of this molar excess

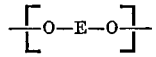  (I)

  (II)

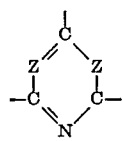  (III)

in which formulae E is the HO-free residuum of a dihydric phenol, E' is the halogen-free residuum of a benzenoid compound having an inert electron-withdrawing group having a sigma* value greater than +0.7 in at least one of the positions ortho or para to the valence bonds, and Z is :N. or :C(C'). where X' is halogen.

2. A thermoset resin according to claim 1 in which E and E' are

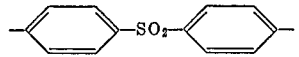

3. A thermoset resin according to claim 1 in which E is

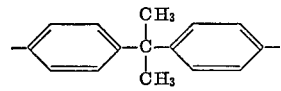

and E' is

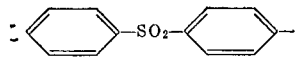

4. A thermosettable prepolymer selected from the group consisting of (1) the prepolymer prepared by heating at a temperature between 180° and 250° C. under anhydrous conditions and in the liquid phase of an inert highly polar solvent, a double alkali metal salt of a dihydric phenol of Formula Ia, a dihalobenzenoid compound of Formula IIa and a polyhaloheterocyclic compound of Formula IIIa, the relative proportions of Ia, IIa and IIIa being such that Ia is in molar excess of IIa and IIIa is present to the extent of about two-thirds of this molar excess HO—E—OH  (Ia)

X—E'—X  (IIa)

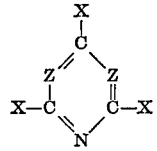  (IIIa)

in which formulae E is the HO-free residuum of a dihydric phenol, E' is the halogen-free residuum of a benzenoid compound having an inert electron-attracting group having a sigma* value greater than +0.7 in at least one of the positions ortho and para to the valence bonds, X is halogen, and Z is :N. or :C(X'). where X' is halogen, and (2) the prepolymer prepared as in (1) except that the combination of IIa with an equimolar amount of a dialkali metal salt of Ia is replaced wholly or in part by an alkali metal salt of a halophenol of Formula IV

  (IV)

where X is as defined above and Y is .SO$_2$., .SO. or .CO. or a radical of the formula Y'—A—Y" in which Y' and Y" are the same or different and each is .SO$_2$., .SO. or .CO. and A is a bivalent organic radical which may be aliphatic, aromatic or non-aromatic heterocyclic and has both valencies linked to carbon atoms; at least some of the monomers being present from the beginning of the reaction.

5. A thermosettable prepolymer according to claim 4, in which the prepolymer is prepared from a reactant mixture which is partially deficient in the double alkali metal salt of a dihydric phenol of Formula Ia, and this component is added to the prepolymer until the deficiency is eliminated.

6. A thermosettable prepolymer according to claim 4 dry-blended with a fibrous reinforcing material selected from the group consisting of glass, asbestos and carbon fibres.

7. A thermosettable prepolymer according to claim 4 blended with a fibrous reinforcement selected from the group consisting of glass, asbestos and carbon fibres.

8. An article comprising a substrate with a thermosettable prepolymer according to claim 4 coated thereon using a solution of the prepolymer in a volatile solvent.

9. A method of making a thermoset resin which comprises heating the prepolymer of claim 4 at a temperature of between 250 and 350° C.

10. A thermosettable prepolymer according to claim 4 wherein all of the monomers are present at the beginning of the reaction.

11. A thermosettable prepolymer according to claim 4 wherein the prepolymer is prepared from a reaction mixture which is at least partially deficient in one component which is added to the prepolymer until the deficiency is eliminated.

References Cited
UNITED STATES PATENTS

| | | | |
|---|---|---|---|
| 3,446,654 | 5/1969 | Barth et al. | 117—123 |
| 3,532,670 | 10/1970 | Schnell et al. | 260—49 |
| 3,634,354 | 1/1972 | Darsow et al. | 260—49 |

OTHER REFERENCES

Feasey Defensive Publication of Ser. No. 801,837, filed Feb. 24, 1969, published in 864 O.G. 1406, on July 24, 1969, U.S. class 260, subclass 49.

LESTER L. LEE, Primary Examiner

U.S. Cl. X.R.

117—161 UN, 161 UT; 260—30.8 DS, 32.6 N, 47 R, 49

UNITED STATES PATENT OFFICE
CERTIFICATE OF CORRECTION

Patent No. 3,784,504         Dated January 8, 1974

Inventor(s) Ronald George Feasey

It is certified that error appears in the above-identified patent and that said Letters Patent are hereby corrected as shown below:

(1) In the heading, Foreign Application Priority Data should be added as follows:

-- March 27, 1968    Great Britain    14767/68
   May 17, 1968      Great Britain    23578/68 --.

(2) Column 7, line 41, the second formula of Claim 3 should read:

Signed and sealed this 21st day of May 1974.

(SEAL)
Attest:

EDWARD M. FLETCHER, JR.            C. MARSHALL DANN
Attesting Officer                   Commissioner of Patents